United States Patent Office 3,305,761
Patented Feb. 21, 1967

3,305,761
CONTROL APPARATUS FOR POWER INVERTER
Theodore M. Heinrich, Aliglaize Township, Allen County, and Andress Kernick, Lima, Ohio, assignors to Westinghouse Electric Corporation, East Pittsburgh, Pa., a corporation of Pennsylvania
Filed June 3, 1963, Ser. No. 284,961
14 Claims. (Cl. 321—45)

This invention relates generally to inverting apparatus and more particularly to such an apparatus which utilizes semiconductor devices of the continuous control type as the switching valves.

It is an object of this invention to provide an improved static inverting apparatus.

It is a further object to provide such a device which is economical to manufacture and operate.

A further object of this invention is to provide such a device which will automatically compensate for the reactive current flow in the loads supplied by the inverting apparatus.

Other objects will be apparent from the specification, the hereinafter appended claims, and the drawings, in which drawings:

Figure 1:
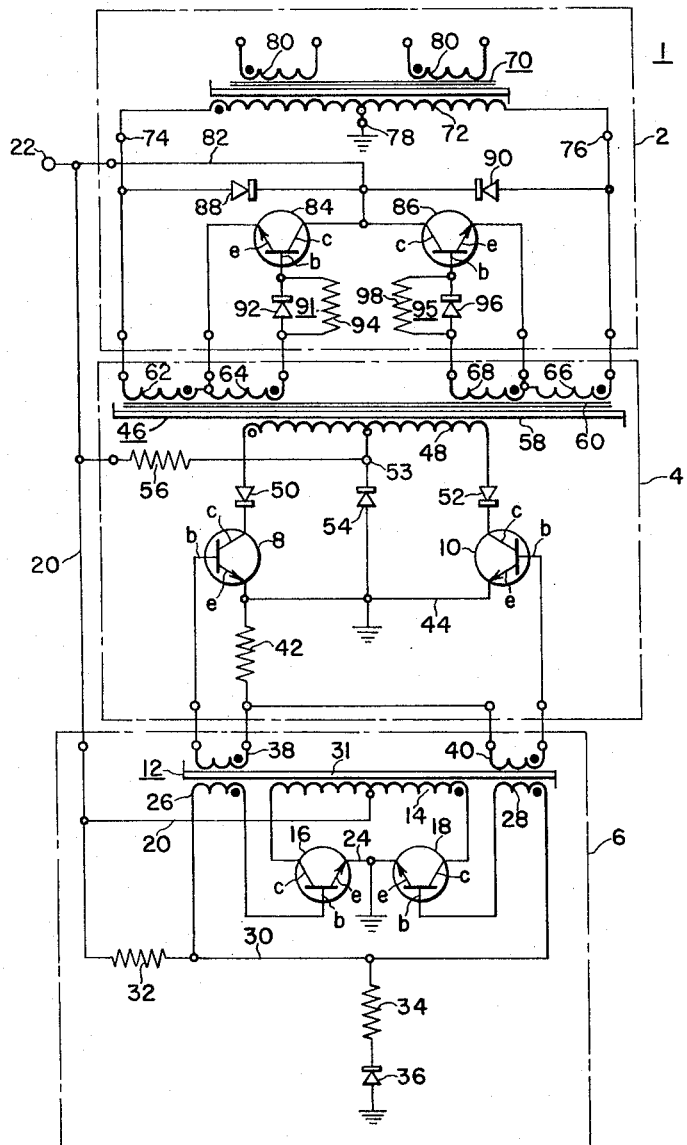
FIGURE 1 is a schematic diagram of an inverter embodying the invention.

Referring to the drawings by characters of reference, the numeral 1 illustrates generally an inverting apparatus comprising a power stage 2, a controlling stage 4 and a pilot oscillator 6. The oscillator 6 may take any form which has an alternating potential output wave having the desired frequency of the output voltage of the inverting apparatus. Preferably, the output wave should have a steep wave front whereby the transistor switches 8 and 10 of the controlling stage 4 are driven quickly into their conducting conditions.

In the illustrated embodiment, the pilot oscillator 6 comprises an output transformer 12 having a center tapped primary winding 14, the end terminals of which are connected to the collectors c of a pair of transistor devices 16 and 18. The center tap connection of the winding 14 is connected by means of a bus 20 to the positive input terminal 22 for connection to a source of unidirectional supply voltage (not illustrated) having its negative terminal grounded. The emitters e of the transistor devices 16 and 18 are connected to a common emitter bus 24 which is grounded as illustrated.

The transformer 12 is provided with control windings 26 and 28. One terminal of the winding 26 is connected to the base b of the transistor 16. The other terminal of the winding 26 is connected to a common conductor 30 which is connected to one terminal of the control winding 28. The other terminal of the winding 28 is connected to the base b of the transistor 18. The windings 26 and 28 are phased with respect to the winding 14 as illustrated by the conventional dots so that when the transistor 16 is conducting and energizing the winding 14, the winding 26 will maintain the transistor 16 fully conducting and the winding 28 will maintain the transistor device 18 fully blocked. Similarly, when the transistor device 18 is conducting the winding 28 will maintain that transistor device fully conducting and the winding 26 will maintain the transistor device 16 fully blocked.

The core 31 of the transformer 12 is preferably fabricated of material having a substantially square hysteresis loop and is driven to saturation by conduction of the transistor devices 16 and 18. When the core 31 saturates, the drive current from the one of the transformer windings 26 and 28 which caused the respective transistor device 16 or 18 to conduct and thereby drive the core 31 to saturation, will terminate. This causes the previously conducting device to become non-conducting whereby the flux in the core 31 returns to its residual flux magnitude. This reduction of flux induces a voltage in the other of the windings 28 or 26 to initiate conduction in the respective transistor device 18 or 16. Due to regenerative action the device 18 or 16 quickly becomes fully conductive and the core 31 is driven toward saturation in the opposite direction. When saturation is reached, the conductive condition of the devices again reverses substantially as described.

A resistor 32 connects the bus 20 to the common conductor 30 to provide for a positive initiation of operation of the pilot oscillator 6 upon energization of the terminal 22. A resistor 34 connects the conductor 30 to ground through a diode 36 to provide a path having a low impedance to base drive to either of the transistors 16 or 18 during the oscillating condition. This path is blocked to base-drive starting current furnished by resistor 32.

For purposes of supplying actuating signals to the controlling stage 4, the transformer 12 is provided with a pair of output or secondary windings 38 and 40. The winding 38 has one terminal connected to the base $b$ of transistor switch 8 while the winding 40 has one of its terminals connected to the base $b$ of the transistor switch 10. The other terminal of each of the windings 38 and 40 is connected through a resistor 42 to the grounded emitter bus 44 which connects with the emitters $e$ of the transistor switches 8 and 10. The polarity of the windings 38 and 40 is such that when the transistor 16 is conducting a base drive current is applied to the transistor switch 10 so that it is rendered conducting. Similarly when the transistor device 18 is conducting, the winding 38 is energized such that the transistor switch 8 is rendered conductive.

The controlling stage 4 includes a hermaphroditic type transformer 46 having a center tapped primary winding 48, the end terminals of which are connected individually through diodes 50 and 52 to the collectors c of the transistor switches 8 and 10. The center tap 53 of the winding 48 is connected through a diode 54 to the grounded emitter bus 44. The center tap 53 is also connected through a resistor 56 to the positive supply bus 20.

The details of the hermaphroditic transformer 46 are illustrated, described and claimed in the copending application of Andress Kernick, Serial No. 80,894, filed January 5, 1961, now U.S. Patent No. 3,170,133 dated February 16, 1965, and assigned to the same assignee as is this application. This transformer 46, for purposes of this application, comprises a pair of iron cores 58 and 60 which couple the primary winding 48 with windings 62, 64, 66 and 68. The core 58 is preferably of a core material having a substantially rectangular hysteresis loop while the core 60 is fabricated of more conventional core material having a higher reluctance than that of the core 58 whereby the core 58 will saturate much ahead of the core 60. As explained in the copending application, if the transformer 46 is arranged for normal operation without saturating the core 58, it will not saturate due to any unbalance of the currents flowing in the windings 48, 62, 64, 66 and 68. While a transformer of the hermaphroditic type is desirable for a variety of reasons, other transformers may be used. Preferably such other transformers should be of a type which will not tend to saturate due to unbalance current flowing through its windings as for example a type having a gap in its magnetic core.

The power stage 2 comprises an output transformer 70 which preferably is also of the hermaphroditic type but which can be of other types which will not saturate with unbalanced half cycles. The transformer 70 is provided with a center tapped primary winding 72 having end terminals 74 and 76 and a grounded center tap 78 and at least one secondary winding 80. The illustrated transformer is provided with two such windings for the purposes of supplying a pair of alternating current loads.

The positive potential terminal 22 is connected through a common collector bus 82 to the collectors $c$ of a pair of power controlling semiconductor valves 84 and 86 which may take the form of power transistors. The emitter $e$ of the valve 84 is connected through the winding 62 to the end terminal 74 while the emitter $e$ of the valve 86 is connected through the winding 66 to the end terminal 76. In order to bypass reactive power around the valves 84 and 86, a pair of power diodes 88 and 90 are provided. The diode 88 is connected in antiparallel with the series-connected switch 84 and winding 62 while the diode 90 is connected in anti-parallel with the series connected winding 66 and the valve 86.

The valve 84 is supplied with drive current from the winding 64 and for this purpose one terminal of the winding 64 is connected to the emitter $e$ and the other terminal of the winding 64 is connected to the base $b$ of the valve 84 through a network 91 comprising a diode 92 connected in shunt with a resistor 94. Similarly, valve 86 is supplied with drive current from the winding 68 which has one terminal connected directly to the emitter $e$ and its other terminal connected through a network 95 to the base $b$. The network comprises a diode 96 connected in shunt with a resistor 98. The polarity of the diodes 92 and 96 are as shown to conduct current from the respective windings 64 and 68 to the bases $b$ of the respective valves 84 and 86.

Figure 2:
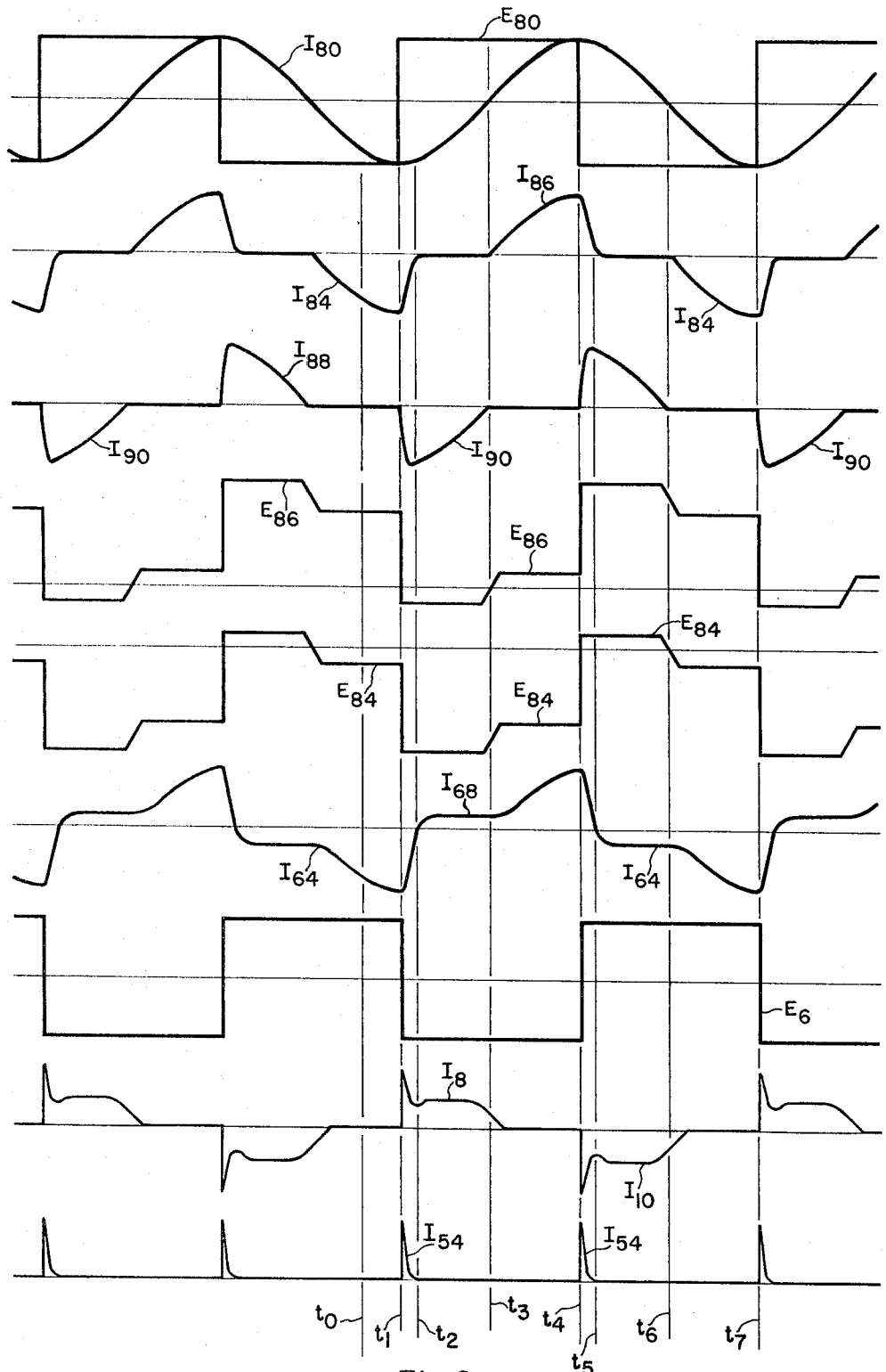
FIG. 2 is a drawing showing certain of the operating characteristics of the form of the invention illustrated in FIG. 1.

It is believed that the remainder of the details of construction of the apparatus 1 may best be understood by a reference to a description of operation which is as follows. When a potential is provided between ground and the positive terminal 22, the pilot oscillator 6 will commence to oscillate in a manner described above in connection with the description of operation thereof. Square waves of voltage as indicated by the reference character $E_6$ in FIG. 2 will be applied by the windings 38 and 40 to the transistor switches 8 and 10 respectively. The phase of the voltage wave applied by the winding 40 to the transistor switch 10 is as illustrated in FIG. 2 while the phase of the voltage applied by the winding 38 to the transistor switch 8 will be 180° out of phase from that illustrated.

Since the inverter 1 is designed to supply an alternating potential, the operation thereof will be described with the inverter 1 in its normal operating state. Assuming a time $t_0$ in which the winding 40 of the pilot oscillator 6 is supplying a positive to negative voltage, base to emitter, to the transistor switch 10. The valve 84 is conducting and current is flowing through the winding 62 of the transformer 46 and the left-hand half of the winding 72 of the transformer 70 whereby the dotted terminals of the windings 62, 64, 66 and 68 of transformer 46 and the dotted terminals of the windings 72 and 80 of the transformer 70 will be positive with respect to the undotted terminals. The power current through the valve 84 is indicated by the curve $I_{84}$ and is the sum of the current through the windings 80 by the curve $I_{80}$. The curve $I_{64}$ indicates the drive current supplied by the winding 64 to the valve 84. The turn ratio of the windings 62 and 64 is such that the drive current supplied by the winding 64 will always be slightly more than sufficient to keep the valve 84 saturated. The magnitude of the current $I_{64}$ will vary with collector current $I_{84}$ through the valve 84. The winding 48 controls the polarity of the transformer 46, but the potential induced in winding 48 by feedback through the winding 62 becomes greater than and of the same polarity as that applied thereto from the terminal 22 through the conductive transistor switch 10. The turns ratio of the winding 48 with respect to the winding 64 is such that when feedback current through winding 62 causes a voltage rise across winding 64 which is equal to the threshold drop of the diode 92 plus the base-emitter drop of the transistor 84, the voltage across the winding 48 exceeds the magnitude of the voltage with respect to ground of the terminal 22. Therefore, although the transistor switch 10 remains saturated and in a conductive condition, it will not conduct because of the presence of the diode 52. The voltage induced in the winding 66 is insufficient to cause current to flow therefrom through the power diode 90, the valve 86 and the network 95. Under these conditions the ampere turns in the winding 62 are substantially balanced (being greater by the exciting current of transformer 46) by the ampere turns flowing in the winding 64 to supply the required drive current to the valve 84.

At a subsequent later time $t_1$, the pilot oscillator 6 will reverse its output voltage whereby the undotted terminals of the windings 38 and 40 will become positive with respect to their dotted terminals. This terminates the saturated or conductive period of the transistor switch 10 and institutes the conductive period of the transistor switch 8. At the instant that the transistor switch 8 was rendered conductive, the dotted terminal of the winding 48 was positive with respect to the terminal 53 and since this circuit has a low impedance a large pulse of current $I_{54}$ will flow from the left-hand terminal of the winding 48, collector to emitter in the transistor switch 8 and diode 54. The turns ratio of the winding 48 with respect to the windings 62, 64, 66 and 68 is such that the impedance of the circuit through the switch 8 is considerably lower than the impedance of the circuit supplied by the winding 64. The magnitude of the initial portion of this current pulse is greater than the current flow through the resistor 56 which is required to absorb all of the voltage from the supply terminal 22 and, as long as it remains greater, the impedance to ground for the current which flows through the resistor 56 is very low and substantially the only current through the switch 8 is that required to balance the current in the winding 62. Therefore, when the switch 8 conducts, the drive current supplied by the winding 64 to the valve 84 will decrease at a very rapid rate.

As the drive current to the switch 84 decreases, the current through the valve 84 will decrease very rapidly as indicated by the portion of the curve $I_{64}$ and by the portion of the current wave $I_{84}$ which follow the time $t_1$. When the magnitude of the current through the diode 54 decreases below the critical magnitude of current through the resistor 56 which is necessary to drop the voltage to zero, the current through the diode 54 will terminate, and current from the terminal 22 will flow through the resistor 56, the left-hand half of the winding 48, the diode 50, collector to emitter of the transistor switch 8 and emitter bus 44 to ground thereby reversing the polarity of the windings of the transformer 46. This occurs at the time $t_2$.

The duration of the substantially horizontal initial portion of the curves $I_{84}$ and $I_{86}$ will be determined by the power factor of the loads supplied by the power transformer 70. In the curves illustrated in FIG. 2 the worst possible condition has been assumed in which the current $I_{80}$ lags the output voltage $E_{80}$ by 90°. Since the power factor of the load is lagging, the current flow through the primary winding 72 will continue even though current flow through the valve 84 has been interrupted. This reactive current flows from the terminal 76 through the power diode 90, the common collector bus 82, the terminal 22, the source of energy, and to the center tap 78. This current flowing through the power diode 90 is indicated by the reference character $I_{90}$.

During the time that this current $I_{90}$ is flowing through the power diode 90 a reverse voltage will be maintained between the terminal 76 and the collector bus 82. This is indicated by the portion of the curve $E_{86}$ between the time intervals $t_1$ and $t_3$. This reverse voltage prevents the valve 86 from conducting even though the transformer 46 is energized by the current $I_8$ to make the non-dotted terminals of the windings of transformer 46 positive with respect to the dotted terminals. At the time $t_3$ the reactive current $I_{90}$ terminates and removes the reverse potential established by the diode 90. Thereupon the valve 86 initiates its conduction and current $I_{86}$ flows. The potential across the valve 86 and winding 66 at this time is indicated by the portion of the curve $E_{86}$ which immediately follows the time interval $t_3$ and is the forward drop of the valve. The reverse and forward potential magnitudes have been exaggerated for illustrative purposes.

It will be appreciated that during the time period $t_2-t_3$, the voltages derived from the windings 66 and 68 are in series additive connection and are of the polarity to cause current to flow from the terminal 76 toward the common collector bus 82. No appreciable current will flow through the winding 66 because the voltage induced in this winding is so low and the impedance afforded by the emitter to base connection of the switch 86 is very high. Current, as indicated by the portion of the curve $I_{68}$ between the times $t_2$ and $t_3$, will flow base to emitter in the switch 86 through the diode 96 which tends to render this valve 86 conducting. However as stated above, as long as current is flowing through the power diode 90 the potential $E_{86}$ is of the wrong polarity and current will not flow through the switch 86.

During this interval in which the reactive current $I_{90}$ is flowing through the diode 90 the windings 62 and 64 will also be energized in series additive relation. The potential of the winding 64 is such as to prevent any collector to emitter conduction of the valve 84 due to the potential appearing across the power diode 88. In order to prevent current from flowing to the collector bus 82 through winding 66, winding 68 and the base and collector of valve 86 from the terminal 76, the diode 96 is placed such that an additional threshold voltage is introduced which adds to the threshold voltage of the base-collector junction of valve 86 thereby shunting the reactive power current through diode 90. The function of resistor 94 is to provide a low impedance path around the diode 92 so that the base-emitter junction of valve 84 can be adequately reverse-biased.

As explained above the valve 86 commenced to conduct upon the termination of the reactive current flow $I_{90}$. This current flows from the common collector bus 82, collector to emitter in the valve 86, winding 66, terminal 76, right-hand portion of the primary winding 72 to the grounded center tap 78. This current $I_{86}$ continues to flow and provide a drive current for the valve 86 as indicated by the portion of the curve $I_{68}$ between the intervals $t_3$ and $t_4$. It will be observed that after the valve 86 conducts and the winding 66 is energized by the curve $I_{86}$ the current $I_8$ becomes zero and remains at this value throughout the remainder of the conducting period of the valve 86. This is due to the fact that when the winding 66 takes over, the potential of the terminal 53 becomes greater than that of 22. This is because of the turns ratio of the windings 68 and 48.

At the time $t_4$ the output voltage of the oscillator 6 reverses causing the switch 10 to conduct thereby removing the drive current $I_{68}$ from the valve 86. The balancing current in this case flows through the switch 10 and right-hand half of the winding 48 followed by the flow of polarity reversing current as illustrated by the curve $I_{10}$ similarly as occurred when the switch 8 conducted and current $I_8$ flowed. During the time interval $t_4-t_5$ a current pulse $I_{54}$ again flows through the diode 48 followed by a reversal in polarity in the winding 48 whereby the winding 64 provides a drive current for preparing the valve 84 for conduction upon the termination of the reactive current $I_{88}$ which flows through the diode 88. At the time $t_6$ this reactive current terminates, the reverse voltage across the valve 84 is removed and the valve 84 conducts as illustrated by the curve $E_{84}$ between the time intervals $t_4-t_7$. When the valve 84 conducts at the time $t_6$, the drive current increases because of the action of the winding 62 as illustrated by the portion of the curve $I_{64}$ between the times $t_6$ and $t_7$. This results in the termination of the current $I_{10}$ through the switch 10 and right-hand half of the winding 48. Current through the left-hand half of the winding 72 and valve 84 is represented by the curve $I_{84}$.

When a power transistor of the type 2N2126 is used for the valves 84 and 86 the turns ratio of the windings 62–66 to 64–68 to 48 of the transformer 46 can be N to 7N to 210N. This winding ratio when coupled with the impedances in the circuit to which the halves of the winding 48 are connected and the circuits to which the windings 64 and 68 are connected is such as to provide a lower impedance to current flow in the winding 48 during the initial time interval of the firing of the transistor switches 8 and 10. The ratio of the turns of the windings 64–66 to 62–66 permits the switches 84 and 86 to be maintained in saturation with a safe margin throughout all magnitudes of collector current and will not cause the switches 84 and 86 to be overdriven so that excessive heating and excessive losses in the switches 84 and 86 are prevented.

Figure 3:
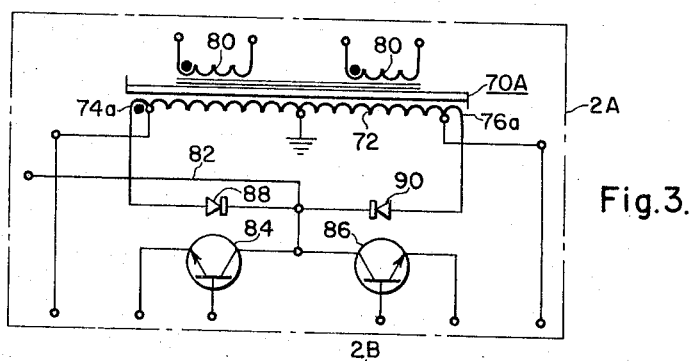
FIG. 3 represents a modified form of the power stage for use in the apparatus of FIG. 1; and, FIG. 4 is a schematic diagram of a modified form of inverter embodying the invention.

In FIG. 3 there is shown a modified power stage 2A which is substitutable for the power stage 2 of FIG. 1 and in which like parts are designated by the same reference characters as used in the power stage 2. The differences between the power stage 2A and the power stage 2 is that the networks 91 and 95 have been eliminated, the primary winding 72 is provided with additional winding portions 74a and 76a which are extensions of the winding 72 and the free terminals of the winding portions 74a and 76a are connected respectively to the anodes of the power diodes 88 and 90. With this form of apparatus the voltage generated in the winding portions 74a and 76a will prevent sufficient collector-base current to flow during the intervals that the inductive current flows through the power diodes 88 and 90. This prevents an undesired reversal of the potential in the windings of the transformer 46. This same function is accomplished in FIG. 1 by the networks 91 and 95. In other respects the operation of the inverting apparatus 1 utilizing the power stage 2A for the power stage 2 is as described above in connection with operation of FIG. 1.

Figure 4:
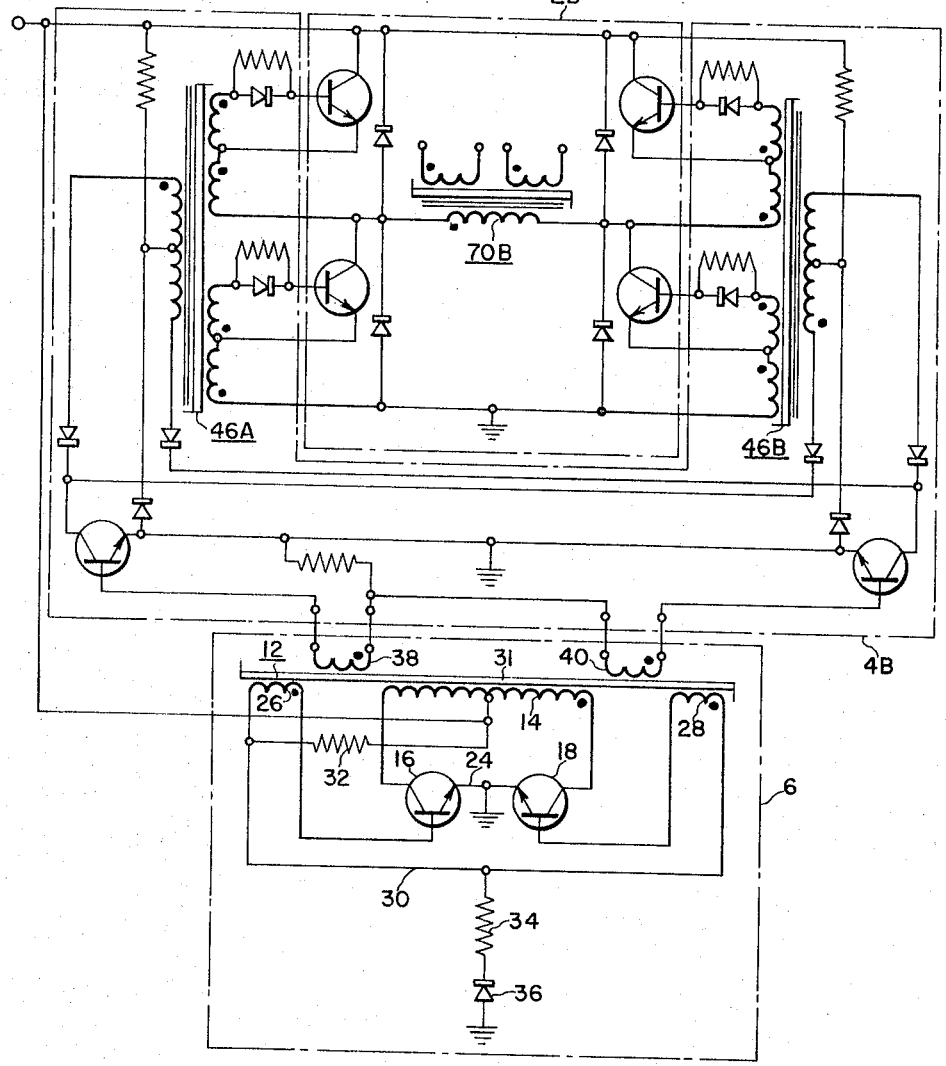

In FIG. 4 the invention has been illustrated when embodied in a bridge type power stage 2B. The controlling stage 4B uses a pair of transformers 46a and 46b in place of the single transformer 46 used in the controlling stage 4. In other respects the operation of the apparatus of FIG. 4 is similar to that of FIG. 1 and will be understood from the foregoing description with respect to the apparatus of FIG. 1.

Although the invention has been described with reference to certain specific embodiments thereof, numerous modifications are possible and it is desired to cover all modifications falling within the spirit and scope of the invention.

What is claimed and is desired to be secured by United States Letters Patent is as follows:

1. A power network comprising a pair of power input terminals, a pair of power output terminals, a semiconductor valve having a pair of main electrodes and a control electrode, a power path connecting said pairs of terminals and including said main electrodes, a current transformer having first and second and third winding portions, said first winding portion being included in said power path, circuit means connecting said second winding portion between one of said main electrodes and said control electrode, said first and second winding portions being phased such that current flow between said main electrodes causes current to flow through said second winding portion in a direction to cause conduction between said main electrodes, a switch, an asymmetric current device having a low impedance to current flow in a first direction and a higher impedance to current flow in a second direction, means connecting said asymmetric device and said switch across said third winding portion, said asymmetric device being polarized such that any current flow through said third winding portion caused by current flow between said main electrodes flows through said asymmetric device in its said first direction, a potential applying circuit connected across said asymmetric device and polarized such that any current flow through said asymmetric device from said potential circuit is in said second direction, and a voltage regulating device in said potential circuit for regulating the voltage applied by said potential circuit to said asymmetric device as a function of the current supplied by said potential circuit.

2. A power network comprising a pair of power input terminals, a pair of power output terminals, a semi-conductor valve having a pair of main electrodes and a control electrode, said valve being characterized by the fact that the impedance to current flow between its said main electrodes is a function of the ratio of the magnitude of said current flow between said main electrodes to the magnitude of the current flow between one of said main electrodes and said control electrode, a power path connecting said pairs of terminals and including said main electrodes, a current transformer having a core and first and second and third winding portions inductively coupled to said core, said first winding portion being included in said power path, circuit means connecting said second winding portion between said one main electrode and said control electrode, said first and second winding portions being phased, such that current flow between said main electrodes causes current to flow through said second winding portion in a direction to cause conduction between said main electrodes, the relative number of turns of said second and first winding portions being such that with current flowing in said first winding portion and no current flowing in said third winding portion the voltage induced in said second winding portion maintains said ratio above a predetermined critical value, a switch, means connecting said switch across said third winding portion.

3. A power network comprising a pair of power input terminals, a pair of power output terminals, a semi-conductor valve having a pair of main electrodes and a control electrode, said valve being characterized by the fact that the impedance to current flow between its said main electrodes is a function of the ratio of the magnitude of said current flow between said main electrodes to the magnitude of the current flow between one of said main electrodes and said control electrode, a power path connecting said pairs of terminals and including said main electrodes, a current transformer having a core and first and second and third winding portions inductively coupled to said core, said first winding portion being included in said power path, circuit means connecting said second winding portion between said one main electrode and said control electrode, said first and second winding portions being phased such that current flow between said main electrodes causes current to flow through said second winding portion in a direction to cause conduction between said main electrodes, the relative number of turns of said second and first winding portions being such that with current flowing in said first winding portion and no current flowing in said third winding portion the voltage induced in said second winding portion maintains said ratio above a predetermined critical value, a switch, an asymmetric current device having a low impedance to current flow in a first direction and a higher impedance to current flow in a second direction, means connecting said asymmetric device and said switch across said third winding portion, said asymmetric device being polarized such that any current flow through said third winding portion caused by current flow between said main electrodes flows through said asymmetric device in its said first direction, and a potential applying circuit connected across said asymmetric device and polarized such that any current flow through said asymmetric device from said potential circuit is in said second direction, and a voltage regulating device in said potential circuit for regulating the voltage applied by said potential circuit to said asymmetric device as a function of the current supplied by said potential circuit, said voltage regulating device acting to reduce the potential applied across said asymmetric device to a value not greater than a predetermined critical magnitude in response to a predetermined magnitude of current flow through said potential applying circuit, and means responsive to a decrease in current flow through said third winding portion to a value not less than said predetermined magnitude of current flow to reverse the potential output of said first and second winding portions.

4. In an inverting apparatus, a plurality of terminals, first and second electric semiconductor valves, each said valve having a pair of main electrodes and a control electrode, a current transformer having a plurality of winding portions, each said winding portion including at least one winding turn, a first power path connecting a first of said terminals to a second of said terminals and including said main electrodes of said first valve and a first of said winding portions, a second power path connecting a third of said power supplying terminals to said second terminal and including said main electrodes of said second valve and a second of said winding portions, means connecting a third of said winding portions between one of said main electrodes and said control electrode of said first valve, means connecting a fourth of said winding portions between one of said main electrodes and said control electrode of said second valve, said first and second winding portions being poled such that current flow through said first portion changes the flux in said transformer in a first direction and current flow through said second portion changes the flux in said transformer in a second direction, said third and said fourth winding portions being poled to render said first valve conductive and said second valve non-conductive in response to a change of flux in said first direction and vice versa in response to a change in flux in said second direction, a first and second switch, asymmetric current flow apparatus having a forward direction and a reverse direction, said forward direction presenting a lesser impedance to current flow through said asymmetric apparatus than said reverse direction, means connecting said first switch and at least a portion of said asymmetric apparatus in series circuit and across a fifth of said winding portions, said portion of said asymmetric apparatus being poled to conduct in said forward direction current caused by the potential induced in said fifth winding portion as a consequence of current flowing in said first valve, means connecting said second switch and at least a part of said asymmetric apparatus in series circuit and across a sixth of said winding portions, said part of said asymmetric apparatus being poled to conduct in said forward direction current caused by the potential induced in said sixth winding portion as a consequence of current flowing in said second valve.

5. In an inverting apparatus, a plurality of terminals, first and second electric semiconductor valves, each said valve having a pair of main electrodes and a control electrode, a current transformer having a plurality of winding portions, each said winding portion including at least one winding turn, a first power path connecting a first of said terminals to a second of said terminals and including said main electrodes of said first valve and a first of said winding portions, a second power path connecting a third of said power supplying terminals to said second terminal and including said main electrodes of said second valve and a second of said winding portions, means connecting a third of said winding portions between one of said main electrodes and said control electrode of said first valve, means connecting a fourth of said winding portions between one of said main electrodes and said control electrode of said second valve, said first and second winding portions being poled such that current flow through said first portion changes the flux in said transformer in a first direction and current flow through said second portion changes the flux in said transformer in a second direction, said third and said fourth winding portions being poled to render said first valve conductive and said second valve non-conductive in response to a change of flux in said first direction and vice versa in response to a change in flux in said second direction, a first and second switch, a potential applying circuit including first and second circuit means, said first circuit means connecting said first switch across a fifth of said winding portions, said second circuit means connecting said second switch across a sixth of said winding portions, and means responsive to a decreasing magnitude of current flow through said first and second circuit means of said potential applying circuit below a predetermined magnitude of current flow to reverse the potential output of said third and said fourth winding portions respectively.

6. In an inverting apparatus, a plurality of terminals, first and second electric semiconductor valves, each said valve having a pair of main electrodes and a control electrode, a current transformer having a plurality of winding portions, each said winding portion including at least one winding turn, a first power path connecting a first of said terminals to a second of said terminals and including said main electrodes of said first valve and a first of said winding portions, a second power with connecting a third of said power supplying terminals to said second terminal and including said main electrodes of said second valve and a second of said winding portions, means connecting a third of said winding portions between one of said main electrodes and said control electrode of said first valve, means connecting a fourth of said winding portions between one of said main electrodes and said control electrode of said second valve, said first and second winding portions being poled such that current flow through said first portion changes the flux in said transformer in a first direction and current flow through said second portion changes the flux in said transformer in a second direction, said third and said fourth winding portions being poled to render said first valve conductive and said second valve non-conductive in response to a change of flux in said first direction and vice versa in response to a change in flux in said second direction, a first and second switch, a potential applying circuit including first and second circuit means, said first circuit means connecting said first switch across a fifth of said winding portions, reversing means responsive to the existence of a magnitude of current flow through said first circuit means of said potential applying circuit of a value below a predetermined magnitude to reverse the output potential of said third and said fourth winding portions, second circuit means connecting said second switch across a sixth of said winding portions, said reversing means being responsive to the existence of a magnitude of said current flow through said second circuit means of said potential applying circuit of a value below said predetermined magnitude to reverse the output potential of said third and said fourth winding portions.

7. In an electrical network, a pair of power input terminals, a power output terminal, a current transformer having plural winding portions, first and second semiconductor valves, each said valve having a pair of main electrodes and a control electrode, a plurality of asymmetric current flow devices, each said device presenting a low impedance to forward current flow and a higher impedance to reverse current flow, a first current path connecting a first of said input terminals and said output terminal for flow of current in a first direction between said first terminal and said output terminal, said first path including said main electrodes of said first valve and a first of said winding portions, a second current path connecting a second of said input terminals and said output terminal for flow of current in a second direction between said second terminal and said output terminal, said second path including said main electrodes of said second valve and a second of said winding portions, a first of said asymmetric devices connected to conduct current in its said forward direction between said first terminal and said output terminal and in a direction opposite to said first direction, a second of said asymmetric devices connected to conduct current in its said forward direction between said second terminal and said output terminal and in a direction opposite to said second direction, means including a third of said asymmetric devices connecting a third of said winding portions between one of said main electrodes and said control electrode of said first valve, means including a fourth of said asymmetric devices connecting a fourth of said winding portions between one of said main electrodes and said control electrode of said second valve, first and second switches, means connecting a fifth of said asymmetric devices and said first switch across a fifth of said winding portions, means connecting said fifth asymmetric device and said second switch across a sixth of said winding portions, said fifth and sixth portions being polarized to pass current through said fifth device in its said forward direction during opposite half cycles of the voltage generated in said transformer, a pair of control terminals, an impedance element, and means including said impedance element connecting said terminals in shunt with said fifth asymmetric device.

8. The combination of claim 7 in which said valves are transistors, said first and second asymmetric devices are diodes, said third and said fourth asymmetric devices each comprise a diode shunted by an impedance element, and said fifth asymmetric device is a diode.

9. The combination of claim 8 in which said switches are control transistors and means is provided to render said control transistors conducting alternately.

10. The combination of claim 9 in which each of said winding portions includes at least one turn and in which the ratio of said turns of said winding portions are as follows:

| Winding portions: | Turns ratio |
| --- | --- |
| 1 | 1 |
| 2 | 1 |
| 3 | 7 |
| 4 | 7 |
| 5 | 105 |
| 6 | 105 |

11. In inverting apparatus, a power transformer having primary winding means and secondary winding means, a current transformer having a plurality of winding portions, first and second semiconductor valves, each said valve having a pair of main electrodes and a control electrode, a pair of power input terminals, a first power path connecting said input terminals to a first portion of said primary winding means and including said main electrodes of said first valve and a first of said winding portions, a second power path connecting said input terminals to a second portion of said primary winding means and including said main electrodes of said second valve and a second of said winding portions, said paths being so arranged that when said first valve conducts said power transformer is energized in one polarity and when said second valve conduits said power transformer is energized in the opposite polarity, means connecting a third of said winding portions between one of said main electrodes and said control electrode of said first valve, means connecting a fourth of said winding portions between one of said main electrodes and said control electrode of said second valve, said first and second winding portions being phased to energize said current transformer in opposite polarity as a consequence of the conduction of said first and second valves, said third and fourth winding portions being phased such that when said current transformer is energized as a consequence of the conduction of said first valve said third winding portion renders said first valve conducting and said fourth winding portion renders said second valve non-conducting, first and second unidirectional current conducting devices, means including a portion of said primary means connecting said first unidirectional device in anti-parallel with said first valve and said first winding portion, and means including a portion of said primary means connecting said second unilateral device in anti-parallel with said second valve and said second winding portion.

12. In inverting apparatus, a power transformer having primary winding means and secondary winding means, a current transformer having a plurality of winding portions, first and second semiconductor valves, each said valve having a pair of main electrodes and a control electrode, a pair of power input terminals, a first power path connecting said input terminals to a first portion of said primary winding means and includnig said main electrodes of said first valve and a first of said winding portions, a second power path connecting said input terminals to a second portion of said primary winding means and including said main electrodes of said second valve and a second of said winding portions, said paths being so arranged that when said first valve conducts said power transformer is energized in one polarity and when said second valve conducts said power transformer is energized in the opposite polarity, means connecting a third of said winding portions between one of said main electrodes and said control electrode of said first valve, means connecting a fourth of said winding portions between one of said main electrodes and said control electrode of said second valve, said first and second winding portion being phased to energize said current transformer in opposite polarity as a consequence of the conduction of said first and second valves, said third and fourth winding portions being phased such that when said current transformer is energized as a consequence of the conduction of said first valve said third winding portion renders said first valve conducting and said fourth winding portion renders said second valve non-conducting, first and second unidirectional current conducting devices, means including a portion of said primary means connecting said first unidirectional device in anti-parallel with said first valve and said first winding portion, means including a portion of said primary means connecting said second unilateral device in anti-parallel with said second valve and said second winding portion, switch means, an interruptable control current conducting path connected across one of said winding portions, means sequentially rendering said control current path conducting whereby current of at least a predetermined magnitude will flow in alternate directions in response to sequential conduction of said first and second paths.

13. In inverting apparatus, a power transformer having primary winding means and secondary winding means, a current transformer having a plurality of winding portions, first and second semiconductor valves, each said valve having a pair of main electrodes and a control electrode, a pair of power input terminals, a first power path connecting said input terminals to a first portion of said primary winding means and including said main electrodes of said first valve and a first of said winding portions, a second power path connecting said input terminals to a second portion of said primary winding means and including said main electrodes of said second valve and a second of said winding portions, said paths being so arranged that when said first valve conducts said power transformer is energized in one polarity and when said second valve conducts said power transformer is energized in the opposite polarity, means connecting a third of said winding portions between one of said main electrodes and said control electrode of said first valve, means connecting a fourth of said winding portions between one of said main electrodes and said control electrode of said second valve, said first and second winding portions being phased to energize said current transformer in opposite polarity as a consequence of the conduction of said first and second valves, said third and fourth winding portions being phased such that when said current transformer is energized as a consequence of the conduction of said first valve said third winding portion renders said first valve conducting and said fourth winding portion renders said second valve non-conducting, first and second unidirectional current conducting devices, means including a portion of said primary means connecting said first unidirectional device in anti-parallel with said first valve and said first winding portion, means including a portion of said primary means connecting said second unilateral device in anti-parallel with said second valve and said second winding portion, first and second switch means, an asymmetric current flow device, first control circuit means connecting said first switch means and said asymmetric current flow device across a fifth of said winding portions, second control circuit means connecting said second switch means and said asymmetric current flow device across a sixth of said winding portions, a source of unidirectional voltage having a drooping voltage magnitude with increase in current and connected in shunt circuit with said asymmetric current flow device, and means closing said first and second switch means in alternating sequence.

14. In an inverting apparatus, a power transformer having primary winding means and secondary winding means, a current transformer having a plurality of winding portions, first and second continuous control type semiconductor switches, each said switch having a main current circuit and a control circuit, a pair of power input terminals, a first power path connecting said input terminals to a first portion of said primary winding means and including said main circuit of said first switch and a first of said winding portions, a second power path connecting said input terminals to a second portion of said primary winding means and including said main circuit of said second switch and a second of said winding portions, said paths being so arranged that when said first switch is conductive said power transformer is energized in one polarity and when said second switch is conductive said power transformer is energized in the opposite polarity, means connecting a third of said winding portions across said control circuit of said first switch, means connecting a fourth of said winding portions across said control circuit of said second switch, said first and second winding portions being phased to energize said current transformer in opposite polarity as a consequence of the conduction of said first and second switches, said third and fourth winding portions being phased such that when said current transformer is energized as a consequence of the conduction of said first switch said third winding portion renders said first switch conducting and said fourth winding portion renders said second switch non-conducting, third and fourth switches, an asymmetric current conducting means, means connecting said third switch and at least a portion of said asymmetric current conducting means across a fifth of said winding portions, means connecting said fourth switch and at least a second portion of said asymmetric current conducting means across a sixth of said winding portions, a source of unidirectional potential having a drooping voltage magnitude with increase in current, means connecting said source across said asymmetric current conducting device in a polarity such that said asymmetric device presents its greater impedance to current flow from said source, and means closing said third and fourth switches in alternating sequence.

References Cited by the Examiner

UNITED STATES PATENTS

| | | | |
|---|---|---|---|
| 3,072,837 | 1/1963 | Hakimoghi | 321—45 X |
| 3,074,000 | 1/1963 | Salihi | 321—45 X |
| 3,117,270 | 1/1964 | Tallieur | 321—18 X |

JOHN F. COUCH, *Primary Examiner.*

W. M. SHOOP, *Assistant Examiner.*